US011518610B2

(12) United States Patent
Miller

(10) Patent No.: US 11,518,610 B2
(45) Date of Patent: Dec. 6, 2022

(54) ELECTRIFIED GARBAGE CONTAINER COVER

(71) Applicant: Eve Miller, Nepean (CA)

(72) Inventor: Eve Miller, Nepean (CA)

(*) Notice: Subject to any disclaimer, the term of this patent is extended or adjusted under 35 U.S.C. 154(b) by 778 days.

(21) Appl. No.: 16/342,349

(22) PCT Filed: Oct. 19, 2017

(86) PCT No.: PCT/CA2017/051242
§ 371 (c)(1),
(2) Date: Apr. 16, 2019

(87) PCT Pub. No.: WO2018/072022
PCT Pub. Date: Apr. 26, 2018

(65) Prior Publication Data
US 2020/0047996 A1    Feb. 13, 2020

Related U.S. Application Data

(60) Provisional application No. 62/410,478, filed on Oct. 20, 2016.

(51) Int. Cl.
*A01M 1/22* (2006.01)
*B65F 1/16* (2006.01)

(52) U.S. Cl.
CPC .......... *B65F 1/1615* (2013.01); *A01M 1/223* (2013.01); *B65F 1/1646* (2013.01)

(58) Field of Classification Search
CPC ...... A01M 1/223; A01M 23/38; A01M 29/24; B65F 1/16
See application file for complete search history.

(56) References Cited

U.S. PATENT DOCUMENTS

| 5,255,468 A * | 10/1993 | Cheshire | A01M 1/04 43/113 |
| 5,280,684 A * | 1/1994 | Filonczuk | A01M 1/10 43/120 |
| 5,385,258 A * | 1/1995 | Sutherlin | B65D 45/00 220/334 |
| 2008/0276875 A1* | 11/2008 | Zigan | A01K 61/02 119/57.9 |
| 2016/0050901 A1* | 2/2016 | Pugh | A01M 1/22 |

* cited by examiner

*Primary Examiner* — Joshua J Michener
*Assistant Examiner* — Henry Hooper Mudd
(74) *Attorney, Agent, or Firm* — MBM Intellectual Property Law LLP

(57) ABSTRACT

The present invention provides an electrified garbage container cover that destroys insects that may attempt to access, or escape from a garbage container. The electrified garbage container cover frame is configured to fit in the opening of a garbage container enclosing or sealing the interior of the garbage container with the lower edge of the electrified garbage container cover. The electrified garbage container cover frame supports a mesh frame portion between the upper and lower edges, which supports an electrified mesh. The electrified mesh is capable of electrifying insects destroying them upon contact. The electrified garbage container cover also has a fastening mechanism supported by the frame, which is configured to attach the electrified garbage container cover to a garbage container. The electrified garbage container cover also has a power source which is able to provide electricity to the electrified mesh, and is capable of being recharged.

10 Claims, 5 Drawing Sheets

ELECTRIFIED GARBAGE CONTAINER COVER

FIELD

The present invention pertains to the field of repelling and/or killing insects and in particular to preventing insects from entering into, or leaving a garbage container by using an electrified garbage container cover that will destroy the insect.

BACKGROUND

Insects are attracted to food scraps, organic material and other substances that are thrown away as garbage. When garbage is collected within a garbage container, it can attract insects to the area. Insects enter into garbage containers and remain there. Often they breed within the container and the number of insects within the container continues to grow. The garbage container can become infested with insects.

Garbage containers may utilize a cover that is designed to prevent insects from entering the container. These covers can be left ajar after use, which allows the insects to access the garbage within. The garbage within a container may also be accessed by insects when the cover is removed for use. Once inside, the insects may proliferate and continue to occupy the garbage container. Insect eggs laid upon or within garbage may hatch within a garbage container, and insects may then proliferate even if the container cover is not removed.

Insects that settle within or around a garbage container are a significant irritation to individuals using the garbage container. This annoyance can be exacerbated if the garbage container is located indoors, and the insects spread within a garage, home, business or otherwise. These insects may also spread germs, infest other areas, decay garbage more quickly, produce odors, produce waste that is harmful or hazardous, and deter individuals from using an insect infested garbage container.

There are a number of well known methods and devices for dealing with insects. Some of these devices have fixed structures to attract the insect and lure them into a trap or to lure them into a position where they will be electrocuted and collected. They also rely on a luring mechanism that is not as attractive to an insect as a garbage container. Some of the other devices require the user to chase or stalk an insect, and then physically swat the insect with the device in order to electrocute and collect it. This method may result in the user missing the insect with the device, allowing the insect to escape. It also takes time and effort for a user to find and stalk an insect.

Therefore there is a need for garbage container cover that is capable of preventing insects from proliferating and infesting a garbage container. The garbage container cover should be able to prevent insect infestation even if insects are able to access the garbage during container use, have accumulated in the area of the container, or are hatched on the garbage within the container. The garbage container cover should reduce or eliminate the number of insects within a container, or attempting to gain access to the container, and will prevent insects from spreading germs, infesting other areas, further decaying garbage, producing odors and waste, and deterring individuals from using a garbage container.

This background information is provided to reveal information believed by the applicant to be of possible relevance to the present invention. No admission is necessarily intended, nor should be construed, that any of the preceding information constitutes prior art against the present invention.

BRIEF SUMMARY

An object of the present invention is to provide an electrified garbage can cover. In accordance with an aspect of the present invention, there is provided a frame configured to fit the opening of a garbage container, said frame supporting a mesh frame portion; a mesh frame portion, which supports an electrified mesh; an electrified mesh, capable of electrifying insects; a fastening mechanism supported by the frame, configured to attach the electrified garbage container cover to a garbage container; and a power source.

BRIEF DESCRIPTION OF THE FIGURES

Embodiments of the present invention will be better understood in connection with the following Figures, in which.

DETAILED DESCRIPTION

Figure 1:
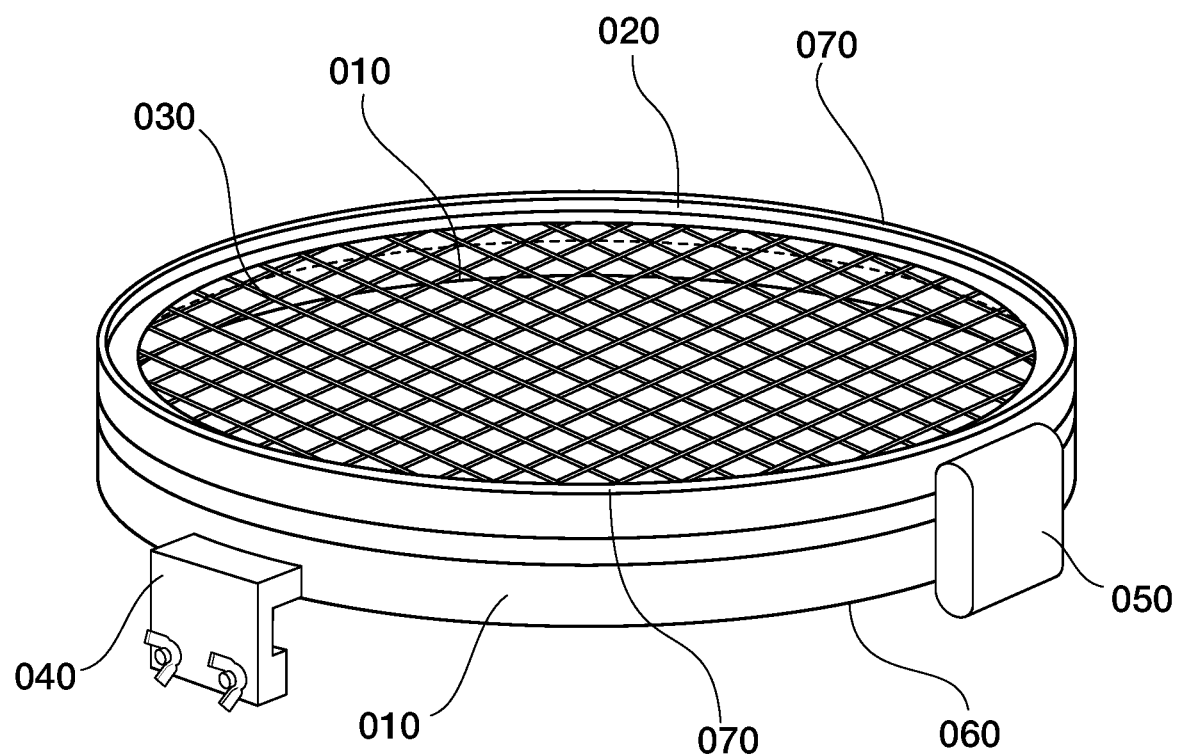
FIG. 1 illustrates a perspective view of the electric garbage container cover.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Electrified Garbage Container Cover Overview

The present invention provides an electrified garbage container cover (also referred to as an "EGCC") that destroys insects that may attempt to access, or escape from a garbage container. The electrified cover comprises a frame, mesh insert and power source. The mesh insert includes an electrified mesh and frame.

The EGCC frame is configured to fit within or upon the opening of a garbage container enclosing and/or sealing the interior of the garbage container with the lower edge of the EGCC. The EGCC frame supports a mesh frame portion which supports an electrified mesh, between the upper and lower edges of the EGCC frame. The electrified mesh is capable of electrifying insects and destroying them upon contact. The EGCC frame optionally includes a fastening mechanism configured to reversible couple the EGCC to the garbage container. The EGCC also has a power source which is able to provide electricity to the electrified mesh.

In one embodiment, the EGCC may be configured to fit a number of different containers, whether the containers hold garbage or otherwise—the EGCC may be configured to fit any vessel.

In one embodiment, the EGCC may be adjustable so that it may be configured to fit multiple containers. In this way the EGCC may be used on different container models of different dimensions, providing an EGCC user the ability to move the EGCC to a container of their choosing.

In one embodiment, the EGCC may be used in conjunction with a garbage container cover. The EGCC may be designed to fit and function upon or within a garbage container when the non-electrified cover is placed upon the garbage container. This configuration will provide two separate layers of protection against insects attempting to gain access to a garbage container.

In one embodiment, the EGCC may be retrofitted with an additional luring component to attract insects to the EGCC. Such additional luring components may be but are not limited to, ultraviolet light sources, insect luring scents, insect luring sounds, or otherwise as would be understood by someone skilled in the art.

In some embodiments, the EGCC is configured to reassembly a traditional garbage container lid and includes a rubber or plastic frame with the electrified mesh inserted mounted therein. The electrified mesh insert is optionally connected to the frame by a hinge or pivot thereby facilitating access the interior of the container. In such embodiments, the power source may be housed in the rubber or plastic frame and may include a battery or plug.

EGCC Frame

In one embodiment, the frame has a lower frame edge adapted to match a garbage container. The frame may also have an upper frame edge, and a frame cutout situated between the outside frame edge and the upper frame edge. The frame cutout is configured to accommodate a mesh frame portion.

In one embodiment, the frame may be adjusted so that is it configured to fit a garbage container. The frame may be adjusted using adjustment mechanisms such as but not limited to collapsing parts, knobs, clips, fasteners, expanders, sliders, retractors, guides, or otherwise as would be understood by someone skilled in the art.

In one embodiment, the frame may be made of a material such as but not limited to metal, plastic, composite, ceramic, rubber, some combination thereof, or otherwise as would be understood by someone skilled in the art.

In one embodiment, the frame lower edge may be grooved, perforated, notched, curved, roughed, sanded, or otherwise as would be understood by someone skilled in the art, so that the frame lower edge is better configured to interact with a garbage container. These features may allow the connection between the EGCC and the Garbage container to be tightened, so as to prevent the ability of an insect to access the garbage container between the frame lower edge and the garbage container top edge.

In one embodiment, the EGCC frame may support at least one attachment mechanism such as but not limited to a clip, screw, nodule, hinge, notch, slot, snap, or otherwise as would be understood by someone skilled in the art. The EGCC frame attachment mechanism may be used to provide strength or functionality to the attachment of the EGCC frame portion to the garbage container.

In one embodiment, the frame cutout may support at least one attachment mechanism such as but not limited to a clip, screw, nodule, hinge, notch, slot, snap, or otherwise as would be understood by someone skilled in the art. The frame cutout attachment mechanism may be used to provide strength or functionality to the attachment of the mesh frame portion to the EGCC frame.

Mesh Frame Portion

In one embodiment, the mesh frame portion may consist of a mesh frame casing and at least one electrified mesh fastener. The mesh frame casing may have a first exterior side and second interior side. The first exterior side of the mesh frame casing may be adapted to fit within a frame cutout. The second interior side of the mesh frame casing may be adapted to couple the electrified mesh within the mesh frame portion.

In one embodiment, the mesh frame portion may be made of a material such as but not limited to metal, plastic, composite, ceramic, rubber, some combination thereof, or otherwise as would be understood by someone skilled in the art.

In one embodiment, the first exterior side of the mesh frame casing may support at least one attachment mechanism such as but not limited to a clip, screw, nodule, notch, hinge, slot, snap, or otherwise as would be understood by someone skilled in the art. The first exterior side of the mesh frame casing attachment mechanism may be used to provide additional strength or functionality in the attachment of the mesh frame portion to the EGCC frame. The first exterior side attachment mechanism of the mesh frame casing may interact with the frame cutout attachment mechanism in order to provide this additional attachment strength or functionality.

In one embodiment, the second interior side of the mesh frame casing may couple the electrified mesh within the mesh frame portion in concert with the at least one electrified mesh fastener.

In one embodiment, the at least one electrified mesh fastener may be used to secure the electrified mesh to the mesh frame portion using a pin, screw, nail, tab, wedge, ring, coil, spring, or otherwise as would be understood by someone skilled in the art.

Electrified Mesh

In one embodiment, the electrified mesh is comprised of a central mesh electrically connected to a power source and supported by the mesh frame portion. The central mesh may have a first side and a second side. The electrified mesh may also be comprised of a first ground mesh located adjacent and spaced apart from the first side of the central mesh, and electrically connected to a power source and supported by the mesh frame portion. It may also be comprised of a second ground mesh located adjacent and spaced apart from the second side of the central mesh and electrically connected to a power source and supported by the mesh frame portion.

In one embodiment, the central mesh is electrically connected to a powered conductor of a high voltage output of a power source. The first ground mesh is electrically connected to at least one ground conductor of a high voltage output of a power source. The second ground mesh is electrically connected to at least one ground conductor of a high voltage output of a power source. This configuration allows the electrified mesh to carry an electric charge capable of destroying an insect.

In one embodiment, the electrified mesh layers may be configured to form parallelogram shaped mesh openings of about four millimeters wide. The openings of the parallelogram shaped mesh may have a repeating diamond shape. The wire thickness forming the repeating diamond shapes may be about 0.33 millimeters for the electrified mesh layers. The mesh may be made from 16 gauge steel.

In one embodiment, the shaped mesh openings of the electrified mesh layers may be sized as would be understood by someone skilled in the art. The openings of the shaped mesh may have a repeating square, rectangle, triangle, or other shape as would be understood by someone skilled in the art. The wire thickness forming the repeating shape may be sized as would be understood by someone skilled in the art. The electrified mesh may be made from a material capable of transmitting electricity, and sized as would be understood by someone skilled in the art.

In one embodiment, when an insect tries to fly between the mesh layers or when an insect walks or moves within the mesh layers, the insect will make contact with the electrified mesh destroying the insect.

In one embodiment, an insect may lay eggs within a garbage container. These eggs may be laid upon the garbage within, the garbage container itself, the electrified mesh, or otherwise as would be understood by someone skilled in the art. In each instance the electrified mesh will act to destroy the insect upon hatching from the egg, or destroy the egg directly if laid upon the electrified mesh.

In one embodiment, the mesh layers may be configured to target specific insects. The aperture of the electrified mesh may be sized to allow certain insects to pass through, while preventing others. The spacing between the layers may be similarly configured to allow certain insects to pass through the electrified layer, while preventing others.

In one embodiment, there may be additional mesh layers incorporated into the electrified mesh. These layers may be arranged in alternating grounded and charged layers corresponding to the existing electrified mesh layers. These additional layers may increase the effectiveness of the EGCC, or may be configured to target the destruction of a specific insect.

In one embodiment, part of the space between the central mesh first side and the first ground mesh of the electrified mesh may be occupied by a first insulating mesh. Part of the space between the central mesh second side and the second ground mesh of the electrified mesh may be occupied by a second insulating mesh. The insulating mesh will act as a safety mechanism that will prevent an EGCC user from receiving an electric shock while using the EGCC.

In one embodiment, the insulating material imposed within the layers of the electrified mesh may be in a configuration other than a mesh configuration. The insulating material may be imposed as rings, stints, pockets, or otherwise as would be understood by someone skilled in the art.

In one embodiment, the insulating mesh layers may be parallelogram shaped having a width of about one centimeter wide. The openings of the parallelogram shaped mesh may have a repeating diamond shape. The wire thickness for the insulating mesh layers forming the repeating diamond shapes may be about 0.5 millimeters.

In one embodiment, the shaped mesh openings of the insulating mesh layers may be sized as would be understood by someone skilled in the art. The openings of the shaped mesh may have a repeating square, rectangle, triangle, or other shape as would be understood by someone skilled in the art. The wire thickness forming the repeating shape may be sized as would be understood by someone skilled in the art. The electrified mesh may be made from a material capable of electricity insulation, and sized as would be understood by someone skilled in the art.

In one embodiment, the electrified mesh may be adaptable so that it is able to stretch and retract in order to accommodate alternative configurations of the EGCC. The adaption may be in the form of flexibility, rigidity, compression, expansion, or otherwise as would be understood by someone skilled in the art.

Fastening Mechanism

In one embodiment, the fastening mechanism comprises at least one clip configured to attach an EGCC frame to a garbage container. This clip will ensure that the EGCC will stay in place in relation to the garbage container opening. It will ensure that insects are not able to escape or enter into the garbage container without having to pass through the electrified mesh of the EGCC.

In another embodiment, the fastening mechanism comprises at least one hinge attachment configured to attach an EGCC frame to a garbage container. This hinge attachment will ensure that the EGCC will stay in place in relation to the garbage container opening, while allowing a EGCC user to easily open and close the EGCC.

In another embodiment, an additional fastening mechanism comprising at least one hinge attachment may be configured to attach the EGCC frame to the mesh frame portion. This hinge attachment will ensure that the EGCC frame will stay in place in relation to the electrified mesh frame portion and garbage container, while also allowing a EGCC user the ability to easily open and close the mesh frame portion while the EGCC frame remains attached to a garbage container.

In one embodiment, the fastening mechanism may clip, grasp, screw, slide, hinge, secure, tie, stick, fasten, attach or otherwise as would be understood by someone skilled in the art, the EGCC frame to the garbage container.

In another embodiment, a fastening mechanism may be engaged or released by the press of a button situated upon the EGCC.

In another embodiment, the fastening mechanism may secure the garbage container to another part of the EGCC.

In one embodiment, the fastening mechanism may provide structural support to the EGCC in order to help the EGCC maintain its shape. For example the multiple fastening mechanisms may clip to the garbage container rim acting to bring a flexible EGCC taught, and locking the EGCC structure into a position that mirrors the shape of the garbage container.

In one embodiment, the fastening mechanism may act as a safety mechanism for the EGCC. For example when the fastening mechanism is engaged, it may concurrently act to close the EGCC circuit. In this configuration, electricity may run through the EGCC only when the fastening mechanism is engaged. An EGCC user or bystander could not be exposed to electricity running through the EGCC unless the fastening mechanism is being used.

Power Source

In one embodiment, the power source for the EGCC may be a battery and a high voltage converter circuit, having a high voltage input electrically connected to the battery power source, and high voltage output including at least one ground conductor and at least a powered conductor.

In one embodiment, the voltage utilized by the power source is sufficient to destroy an insect. The voltage may be in the range of 500 to 1500 volts. In another embodiment, the voltage utilized by the power source may be increased to 2400 volts to provide sufficient electricity voltage to completely vaporize insects, so that the electrified mesh stays clean and free of insects.

In one embodiment, the current range utilized by the power source may be sufficient to destroy an insect, but also remain safe for humans. The current may be in the range of less than 45 nanofarads, less than 45 microcoulombs, or less than 5 milliamperes. The current may be direct current (DC) or alternating current (AC).

In one embodiment, the current range, voltage, or other electric property utilized by the power source will be as would be understood by someone skilled in the art.

In one embodiment, the power source may utilize a circuit closing mechanism that is capable of regulating whether or not electricity is permitted to flow through the EGCC. The circuit closing mechanism may be an 'on-off' switch, which the EGCC user may manually control.

In one embodiment, it is contemplated that the EGCC 'on-off' switch may be controlled in some other way. This control may be automatic, remote, digital, or otherwise as would be understood by someone skilled in the art.

In one embodiment, the circuit closing mechanism may comprise at least two contacts. A first contact may be configured to attach the EGCC frame, while a second contact configured to attach to the mesh frame portion. When the mesh frame portion is closed within the EGCC frame, the contacts will connect, and will permit electricity to be sent throughout the EGCC. If an EGCC user opens the mesh frame portion within the EGCC frame to throw out additional garbage, the contacts will no longer connect and electricity will not be permitted to pass through the EGCC.

In one embodiment, the power source may be rechargeable using a power source charger, that can connect and transfer electricity between a wall outlet and the battery power source.

In one embodiment, the power source may be supported within the fastening mechanism. For example, the fastening mechanism may be designed to facilitate batteries used to power the EGCC. In another embodiment, another part of the EGCC will be adapted to support the power source. For example, the EGCC frame may be adapted to house a power connector so that a charging source may be plugged directly into the EGCC frame.

The invention will now be described with reference to specific examples. It will be understood that the following examples are intended to describe embodiments of the invention and are not intended to limit the invention in any way.

EXAMPLES

Figure 2:
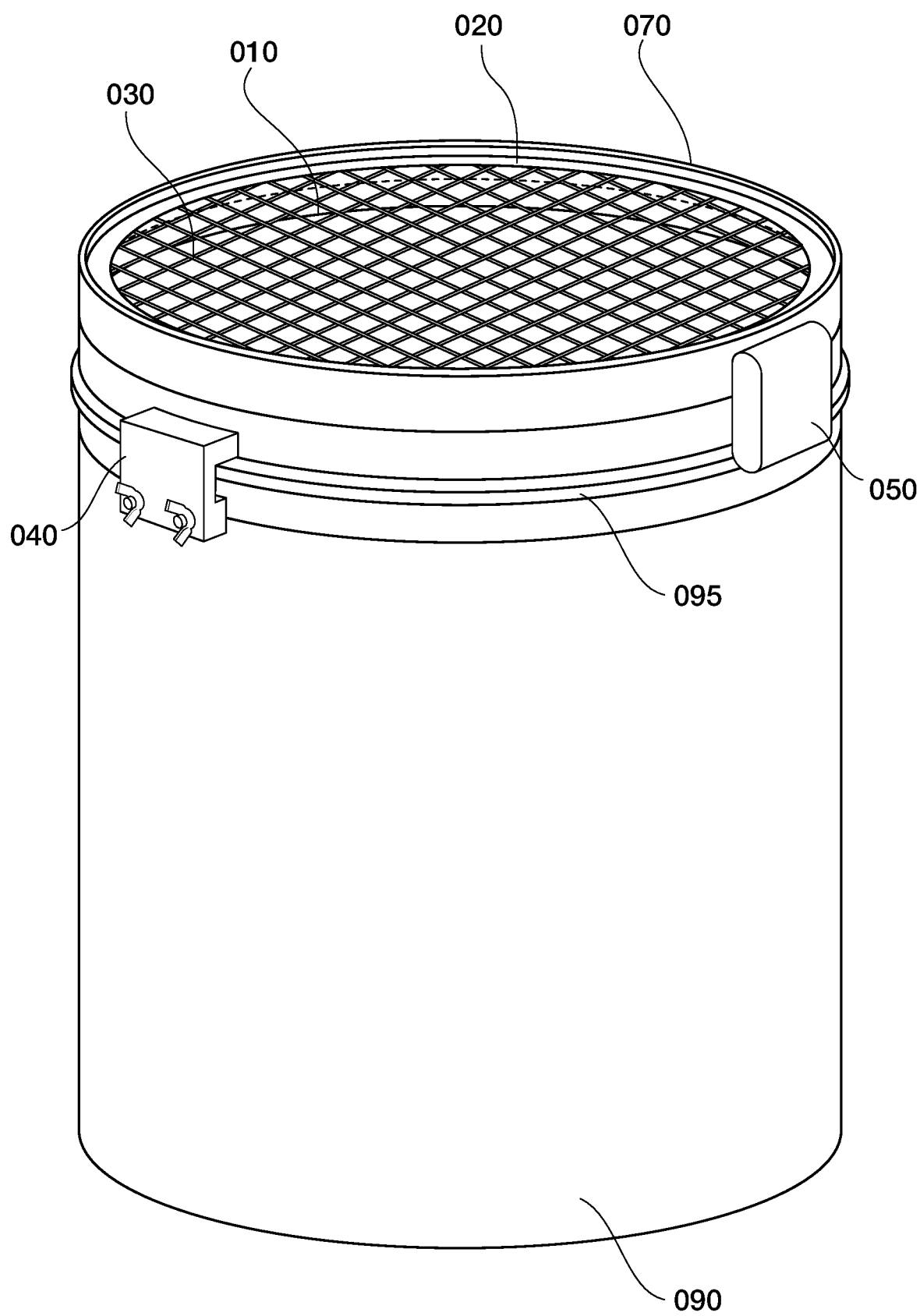
FIG. 2 illustrates a perspective view of the electric garbage container cover attached to a garbage container.

In one embodiment as illustrated in FIG. 1 and FIG. 2, the EGCC frame 010 is configured to fit the opening of a garbage container 090, and has a lower frame edge 060 adapted to attach to a garbage container, and upper frame edge 070. The mesh frame portion 020 is supported by the frame, and supports an electrified mesh 030. The electrified mesh is capable of electrifying insects and is powered by a power source 050. The power source may consist of a battery power source, and a high voltage converter circuit, having a high voltage input electrically connected to the battery power source, and high voltage output including at least one ground conductor and at least one powered conductor. The EGCC also has a fastening mechanism 040 that may be used to attach the EGCC to a garbage container. The fastening mechanism may be fastened to the top edge of a garbage container 095, to enclose or seal the bottom edge of the frame to the garbage container. In this configuration there is no space for an insect to infiltrate or escape from the garbage container without having to pass through the electrified mesh.

Figure 3:
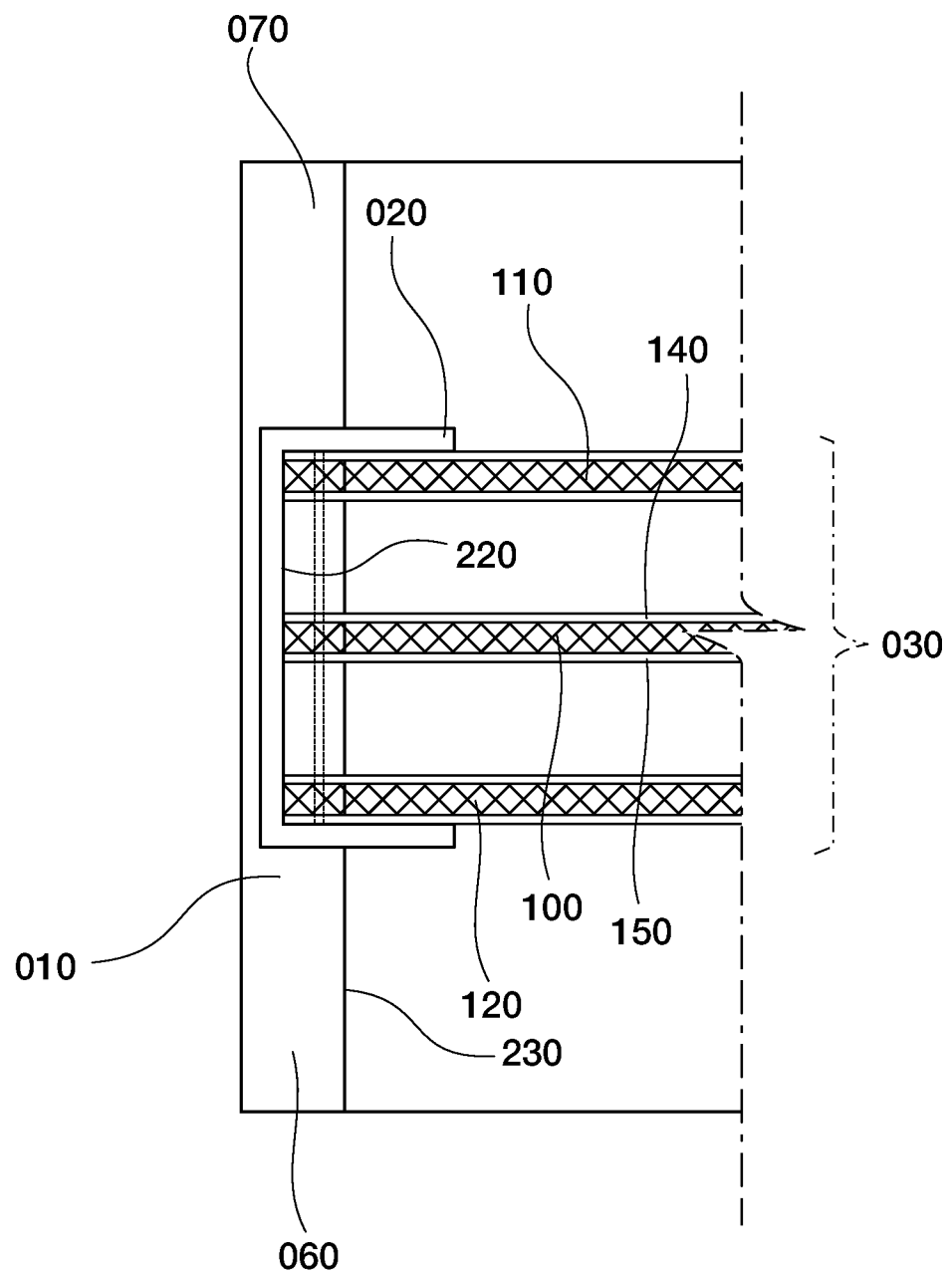
FIG. 3 illustrates a cross-sectional view of the electric garbage container cover.

In one embodiment as illustrated in FIG. 3, the EGCC frame 010 has a lower frame edge 060 adapted to attach to a garbage container, and upper frame edge 070. It also has a frame cutout 080 between the outside frame edge and the upper frame edge, configured to accommodate a mesh frame portion 020. The mesh frame portion is comprised of a mesh frame casing 200 having a first exterior side 210 and second interior side 220, the first exterior side adapted to fit within the frame cutout, the second interior side adapted to couple the electrified mesh 030 within the mesh frame portion, and an electrified mesh fastener 230 that aids in coupling the electrified mesh to the second interior side of the mesh frame casing. The electrified mesh is made up of a central mesh 100 having a first side 140 and a second side 150, which is electrically connected to a power source and supported by the mesh frame portion. The electrified mesh also utilizes a first ground mesh 110 located adjacent and spaced apart from the first side of the central mesh, which is also electrically connected to a power source and supported by the mesh frame portion. The electrified mesh further utilizes a second ground mesh 120 located adjacent and spaced apart from the second side of the central mesh, which is electrically connected to a power source and supported by the mesh frame portion.

Figure 4:
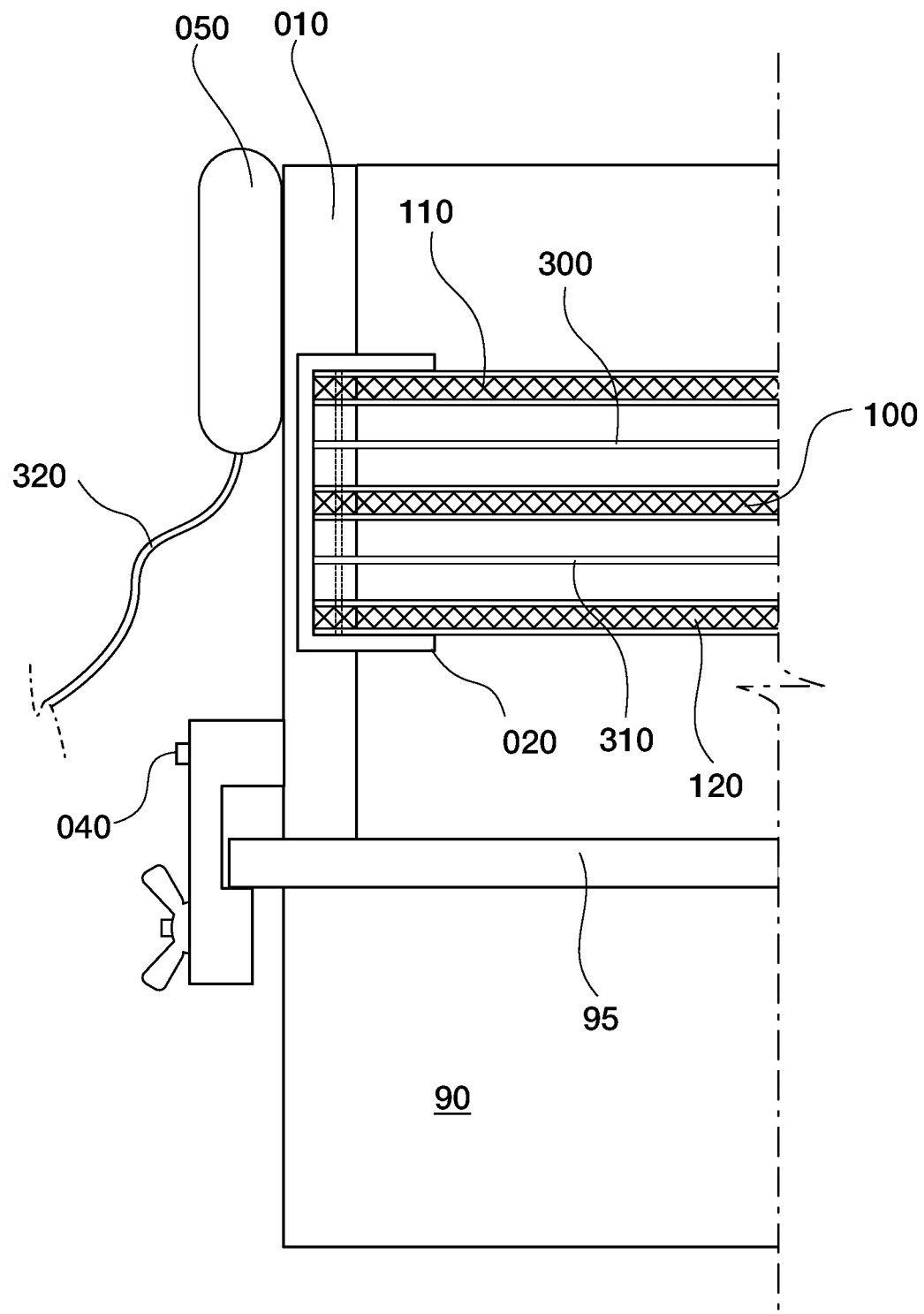
FIG. 4 illustrates a cross-sectional view of the electric garbage container cover attached to a garbage container.

In one embodiment as illustrated in FIG. 4, the EGCC frame 010 is adapted to match the top edge of a garbage container 095. The fastening mechanism 040 is a clip configured to attach the frame to the garbage container 090. The power source 050 is charged using a battery power source charger 320 that can connect and transfer electricity between a home wall outlet and the battery power source. The central mesh 100 is electrically connected to the powered conductor of the high voltage output of the power source. The first ground mesh 110 and second ground mesh 120 are electrically connected to a ground conductor of the high voltage output of the power source. The space between the central mesh first side and the first ground mesh may be occupied by a first insulating mesh 300. The space between the central mesh second side and the second ground mesh may be occupied by a second insulating mesh 310.

Figure 5:
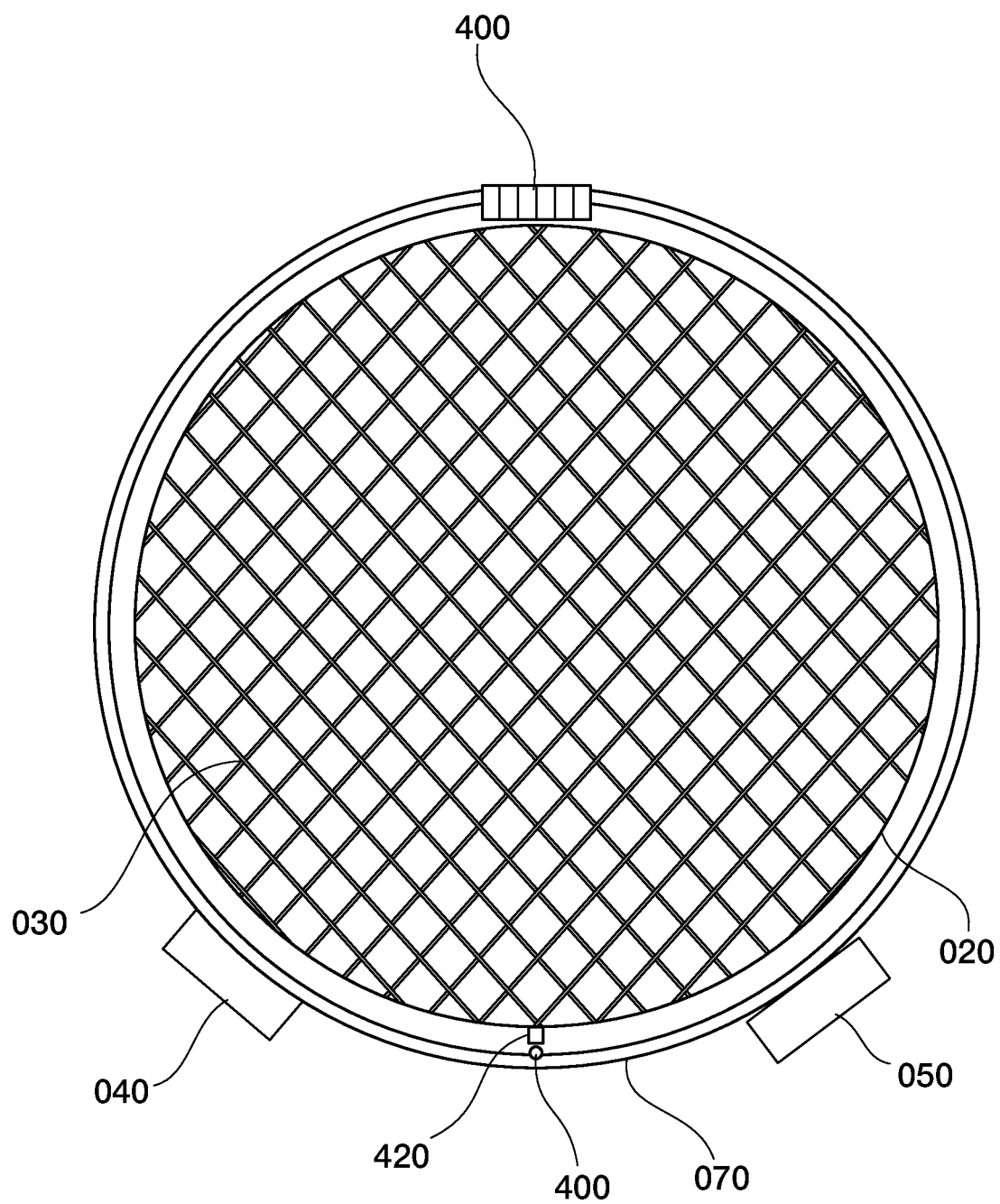
FIG. 5 illustrates a top view of the electric garbage container cover

In one embodiment as illustrated in FIG. 5, the upper frame edge 070 of the EGCC is connected to the mesh frame portion 020 (which supports an electrified mesh 030) by a hinge attachment 400. The hinge attachment is capable of ensuring that the EGCC frame will stay in place in relation to the electrified mesh frame portion and garbage container, while also allowing a EGCC user the ability to easily open and close the mesh frame portion while the EGCC frame remains attached to a garbage container. The EGCC also utilizes an EGCC frame first contact 410, and a second mesh frame portion contact configured 420. These contacts make up a circuit closing mechanism that when connected, permit electricity to run within the EGCC.

In one embodiment by way of example, an EGCC user may wish to place additional garbage within a garbage container that is fitted with an EGCC. In this closed state, a circuit closing mechanism comprising contacts located upon the EGCC frame and the mesh frame portion may be connected, which permits electricity to run within the EGCC. The EGCC user may then press a button located upon the EGCC frame. This button may release a closed hinge mechanism that attaches the EGCC frame to the mesh frame portion. The mesh frame portion will open, permitting the EGCC user to deposit more garbage within the container, while additionally preventing electricity to run through the EGCC. Once the new garbage has been deposited, the EGCC user may press the button again, which will close the hinge causing the mesh frame to reengage with the EGCC frame. The contacts located upon the EGCC frame and the mesh frame portion may also then reengage. The electricity will again be permitted to run through the EGCC preventing insects from actively infiltrating the container.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The scope of the claims should not be limited by the preferred embodiments set forth in the examples, but should be given the broadest interpretation consistent with the description as a whole.

I claim:

1. An electrified garbage container cover comprising:
    a frame configured to fit the opening of a garbage container, said frame supporting a mesh frame portion;
    a mesh frame portion, which supports an electrified mesh;
    an electrified mesh, capable of electrifying insects;
    a fastening mechanism supported by the frame, configured to attach the electrified garbage container cover to a garbage container; and
    a power source;
    wherein the electrified mesh comprises:
    a central mesh having a first side and a second side, the central mesh electrically connected to the power source and supported by the mesh frame portion;
    a first ground mesh located adjacent and spaced apart from the first side of the central mesh and electrically connected to the power source and supported by the mesh frame portion;
    a second ground mesh located adjacent and spaced apart from the second side of the central mesh and electrically connected to said power source and supported by the mesh frame portion.

2. The electrified garbage container cover of claim 1, wherein the frame comprises: a lower frame edge adapted to attach to a garbage container;
    an upper frame edge; and
    a frame cutout between an outside frame edge and the upper frame edge, configured to accommodate the mesh frame portion.

3. The electrified garbage container cover of claim 1, wherein the power source comprises: a battery power source; and
    a converter circuit having a voltage input electrically connected to the battery power source, and output including at least one ground conductor and at least one powered conductor, wherein voltage of the electrified mesh is between 500 to 1500 volts or up to 2400 volts.

4. The electrified garbage container cover of claim 1, wherein the mesh frame portion comprises:
    a mesh frame casing having a first exterior side and second interior side, the first exterior side adapted to fit within a frame cutout, the second interior side adapted to couple the electrified mesh within the mesh frame portion; and
    at least one electrified mesh fastener.

5. The electrified garbage container cover of claim 1, wherein the fastening mechanism comprises at least one clip configured to attach the frame to the garbage container.

6. The electrified garbage container cover of claim 1, wherein the frame is configured to attach the frame to the garbage container with the use of a hinge.

7. The electrified garbage container cover of claim 1, wherein the frame is configured to attach the frame to the mesh frame portion with the use of a hinge.

8. The electrified garbage container cover of claim 3, wherein:
    the battery power source is charged using a battery power source charger that is configured to connect and transfer electricity between a home wall outlet and the battery power source.

9. The electrified mesh of claim 1, wherein:
    the central mesh is electrically connected to the powered conductor of the voltage output of the power source;
    the first ground mesh is electrically connected to the at least one ground conductor of the voltage output of the power source; and
    the second ground mesh is electrically connected to the at least one ground conductor of the output of the power source, wherein voltage of the electrified mesh is between 500 to 1500 volts or up to 2400 volts.

10. The electrified mesh of claim 1, wherein:
    the space between the central mesh first side and the first ground mesh may be occupied by a first insulating mesh; and
    the space between the central mesh second side and the second ground mesh may be occupied by a second insulating mesh.

* * * * *